Dec. 22, 1959    R. W. HOUGHTON ET AL    2,918,625
ULTRA LOW FREQUENCY PHASE METER
Filed May 10, 1954    4 Sheets-Sheet 1

Inventors
Richard W. Houghton
Robert E. Crosby, Jr.
By Alois C. Graf
Attorney

Dec. 22, 1959    R. W. HOUGHTON ET AL    2,918,625
ULTRA LOW FREQUENCY PHASE METER

Filed May 10, 1954                          4 Sheets-Sheet 2

Inventors
Richard W. Houghton
Robert E. Crosby, Jr.
By Alois W. Graf
Attorney

Dec. 22, 1959

R. W. HOUGHTON ET AL 2,918,625

ULTRA LOW FREQUENCY PHASE METER

Filed May 10, 1954

Inventors
Richard W. Houghton
Robert E. Crosby, Jr.
By Alois W. Graf
Attorney

United States Patent Office 2,918,625
Patented Dec. 22, 1959

2,918,625

ULTRA LOW FREQUENCY PHASE METER

Richard W. Houghton, Littleton, and Robert E. Crosby, Jr., Watertown, Mass., assignors to Acton Laboratories, Inc., Acton, Mass.

Application May 10, 1954, Serial No. 428,554

5 Claims. (Cl. 324—83)

The present invention relates to an ultra low frequency measuring system, and more particularly to a measuring system for determining the time interval between the zero line crossing in a positive direction of two alternating currents which are to be compared.

More recently there has been increased activity in the servo, geophysical, and mechanical measurement fields, particularly with respect to the ultra low frequency spectrum. Theoretically those desiring to make measurements or produce certain mechanisms would be desirous of operating their systems at frequencies approaching a direct current level or zero cycles per second. At the present time the practical lower frequency limit appears to be 0.01 cycle per second, primarily because this is the lowest frequency readily available from most commercial oscillators on the market today. Other applications in these fields appear to be adequately covered in the region between 0.01 and 100 cycles per second. Within this frequency range, as well as the higher frequencies, there occurs the problem of phase shift or time delay through networks and components which must be measured.

A time delay or phase shift in either the electrical circuit or the mechanical components may be encountered in a servo hydraulic control system. Therefore, it would be desirable to obtain precise measurement of the time delay or phase shift for signals passing through the components or networks in such system.

One of the primary problems in designing a phase measuring system to cover the frequency range from 0.01 to 100 cycles per second is the provision of an adequate metering circuit. At audio frequencies, the d'Arsonval type meter normally used will integrate the output current from a phase detecting circuit over one complete cycle. With a properly damped instrument, operation becomes extremely sluggish. In the ultra low frequency range, lightly damped meters will tend to follow the current output of a phase detecting system.

In accordance with the present invention, it is proposed to obviate the disadvantages of the heretofore systems of phase measurement at ultra low frequencies by providing for the gating of a pulsed source at points in time corresponding to the positive-going zero-axis crossings of the incoming signals. The pulse repetition rate is selected or adjusted to value such that the counting system records the number of pulses to give an indication directly in degrees or fraction of degrees of phase shift.

It, therefore, is an object of the present invention to provide an improved low frequency apparatus for measuring phase.

Another object of the invention is to provide an improved low frequency phase measuring or time interval indicating system.

Still another object of the invention is to provide an improved system for measuring phase or time-interval between the zero-axis crossings in a positive direction of two alternating currents to be compared.

A still further object of the invention is to provide an improved low frequency phase measuring system particularly adapted to operate in the range of 0.01 to 100 cycles per second.

Other and further objects of the invention subsequently will become apparent by reference to the following description taken in conjunction with the accompanying drawings, wherein.

Figure 1:
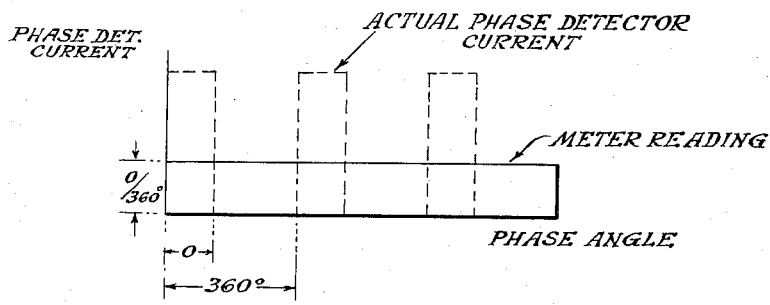
Figure 1 is a diagram explanatory of the problem to be solved by the present invention.

One of the problems encountered in providing for the accurate indication of phase within the frequency range of 0.01 to 100 cycles per second is the provision of an adequate metering circuit. In Figure 1 there has been shown a number of pulses produced by a phase detector. These are shown by the rectangular representations. A lightly damped d'Arsonval instrument, operating in the audio frequency range, would not respond to these pulses individually, but would integrate the pulses so as to produce an indication such as that shown for the meter reading which is substantially constant. The same instrument, operated in the ultra-low frequency region, will not integrate this information. Instead, meter deflections, varying in accordance with the pulsed input current, will be observed. It, therefore, is apparent that it is impractical to adopt the present type of phase detector circuits such as those normally used in audio frequency instruments for measurement of phase relations in the ultra low frequency range.

Figure 2:
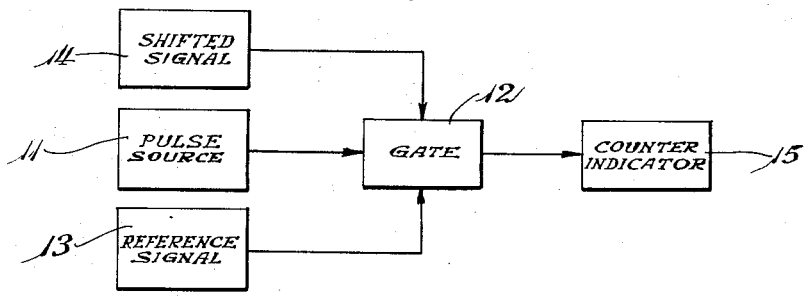
Figure 2 is a block diagram illustrating a system contemplated by the present invention.

In view of the difficulties which would be encountered by use of the conventional d'Arsonval type meter, it is proposed to employ a pulse counting circuit as an indicating device. A variable frequency oscillator is provided to generate the pulses to be counted. These pulses are supplied to a gate which is controlled at points-in-time corresponding to the positive-going zero-axis crossings of the respective incoming alternating current signals or pulses. By this means the number of pulses between two consecutive positive-going zero-axis crossings of one signal are counted; then the pulses between the respective positive-going zero-axis crossings of a shifted signal and a reference signal are counted. If the variable frequency oscillator has been adjusted so that the number of pulses counted in the first instance equals 360, then the second reading taken will indicate the phase shift directly in degrees. A system suitable for this purpose is shown by the block diagram in Figure 2 where the variable frequency oscillator or pulse source 11 is connected to a gate circuit 12. A reference signal 13 is connected to the gate circuit and likewise a shifted signal 14 is connected thereto. The output of the gate comprising a number of pulses obtained from the source 11 is supplied to a counter indicator 15.

Figure 3:
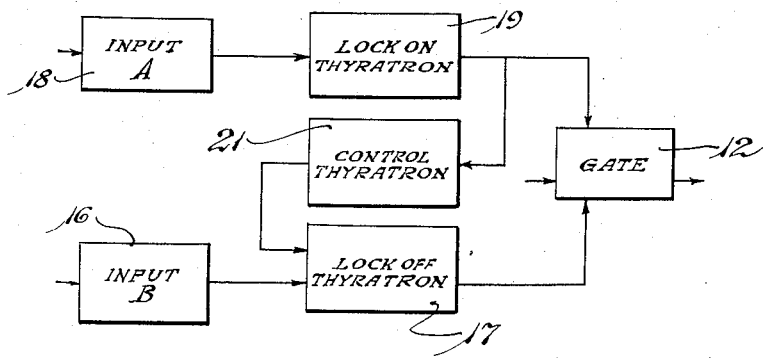
Figure 3 is another block diagram showing further components used in accordance with the teaching of the present invention.

In order to control the gate circuit to avoid any ambiguity, further refinement is provided as indicated in Figure 3, wherein the reference signal passes through an input circuit 16 to properly isolate the remaining circuit to control a lock-off thyratron 17, which in turn is connected to the gate 12. The shifted signal is connected to an input circuit 18 again for the purpose of isolation, which in turn is connected to control a lock-on thyratron 19 which also applies a control potential to the gate circuit 12. A portion of the output signal of the lock-on thyratron 19 is supplied to a control thyratron 21, which in turn controls the operation of the lock-off thyratron 17.

It now may be assumed that an input signal passing through the input circuit A produces a pulse at the first positive-going axis crossing of the input voltage to initiate operation of the lock-on thyratron 19. The lock-on thyratron 19 renders the gate circuit 12 conductive to permit the higher frequency pulses from the pulse source 11 to pass on to the counter indicator 15. A pulse developed at the first positive-going zero-axis crossing of the reference voltage passing through the input circuit B initiates operation of the lock-off thyratron 17, which in turn locks the gate circuit 12 in the off position to cut off or stop the flow of pulses to the counter indicator 15. Both the thyratron circuits 17 and 19 have the characteristic that when they once are rendered conductive, they remain in that condition until the anode voltage is reduced or interrupted. These characteristics provide an arrangement which enables one to take a reading at any time after the gate circuit has been closed, and they further prevent the counter from adding successive readings. A suitable re-set switch is provided for operation after a reading has been taken to return the counter and thyratron circuits to their initial condition. The thyratron 21 interposed between the lock-on thyratron 19 and the lock-off thyratron 17 prevents the lock-off thyratron 17 from becoming conductive prior to conductivity of the lock-on thyratron 19.

Figure 4:
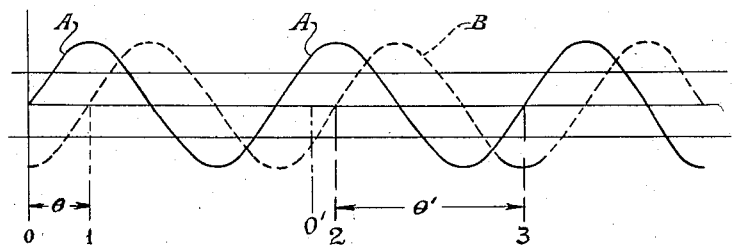
Figure 4 is a graphical representation to illustrate the operation of the system shown in the block diagrams of Figures 2 and 3.

Figure 4 serves to further illustrate the intended operation of the system shown in Figure 3. The solid line A indicates the signal applied to the input circuit A, which at the zero interval initiates operation of the lock-on thyratron 19. Subsequently the dotted line signal, B, passing through the input circuit 16 crosses the zero axis at the point 1 in Figure 4 at a time subsequent to the crossing of the signal A, which is indicated by an angle $\theta$. Due to the operation of the control thyratron 21, this is the only operation that can occur. At the point 2 the signal B is in a positive-going direction which would tend to initiate operation of the gate circuit 12, which, however, has been closed due to the previous operation of the lock-off thyratron 17. If now subsequently the signal A at point 3 is in a positive-going direction, it would tend to render conductive the lock-on thyratron 19 to open the gate 12, which, however, cannot occur because the gate 12 has been locked off by the thyratron 17. It may be likewise shown that the initial application of input signal voltages at points in time corresponding to 0' in Figure 4, this representing a period after the positive-going zero-axis crossing of wave A and before the positive-going zero-axis crossing of wave B, will not cause lock-off thyratron 17 to fire prematurely. In every case the firing of lock-on thyratron 19 must precede the operation of thyratrons 21 and 17.

The use of separate thyratrons to control the gate circuit 12 in the open and closed conditions made it possible to use relatively short ionization periods for each operation. The ionization time of a thyratron is of the order of 0.5 microsecond, and the deionization time from 35 to 75 microseconds. This latter figure would tend to reduce the inherent accuracy of the system if used at the upper end of the frequency range. This occurs because the input frequency of 100 cycles per second is equivalent to a period of 0.01 second where one degree is equal to 0.028 millisecond.

Figure 5:
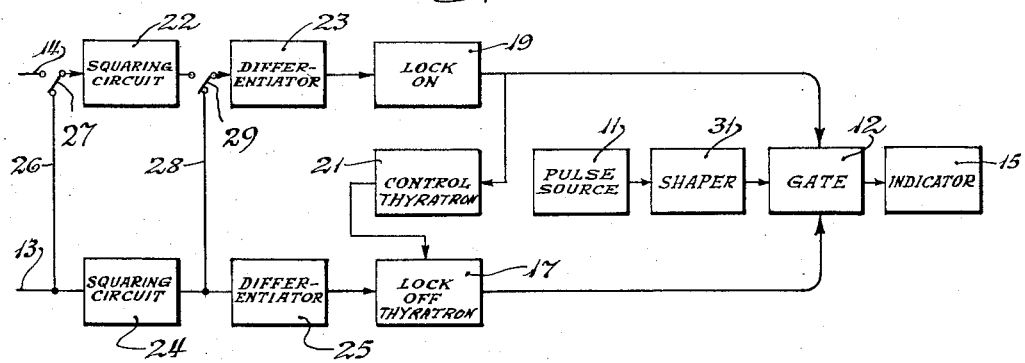
Figure 5 is a block diagram showing still further details and components of the measuring system contemplated by the present invention.

A complete phase measuring system employing the locked gate and counter circuit is shown in the block diagram of Figure 5. The input signal 14 is supplied to a squaring circuit 22, which then is fed to a differentiating circuit or differentiator 23 to apply the necessary potential to the lock-on thyratron 19. The reference signal 13 is supplied to a similar squaring circuit 24, which in turn is fed to a differentiator 25 to control the lock-off thyratron 17. The signal 13 may be transmitted by a conductor 26 to the squaring circuit 22 by manipulation of a switch 27 for a purpose subsequently to become apparent. Likewise the output of the squaring circuit may be transmitted by a conductor 28 to the differentiator 23. With the switch 27 connected to the conductor 26, and the switch 29 connected to the squaring circuit 22, the same signal is applied to both channels. Under such condition the internal phase shift in both channels can be adjusted so as to give a zero reading on the indicator 15. With the switch 27 connected to the conductor 14, and the switch 29 connected to the conductor 28, the same squared signal is supplied to both differentiators. The first pulse will initiate operation of the lock-on thyratron 19, but will not affect the lock-off thyratron 17. The second pulse at one cycle later will then initiate operation of the lock-off thyratron 17. The pulse source 11 is connected through a shaping circuit 31 to the gate 12, and the pulse source 11 is thus adjusted so that in the one cycle interval the indicator 15 gives a reading of 360. Such reading will then now indicate the phase angle directly in degrees between the two signals of the conductors 13 and 14 when switches 27 and 29 are moved to their uppermost positions. The indicator circuit 15 is of a conventional type wherein the accuracy is equal to ±1 count.

Figure 6:
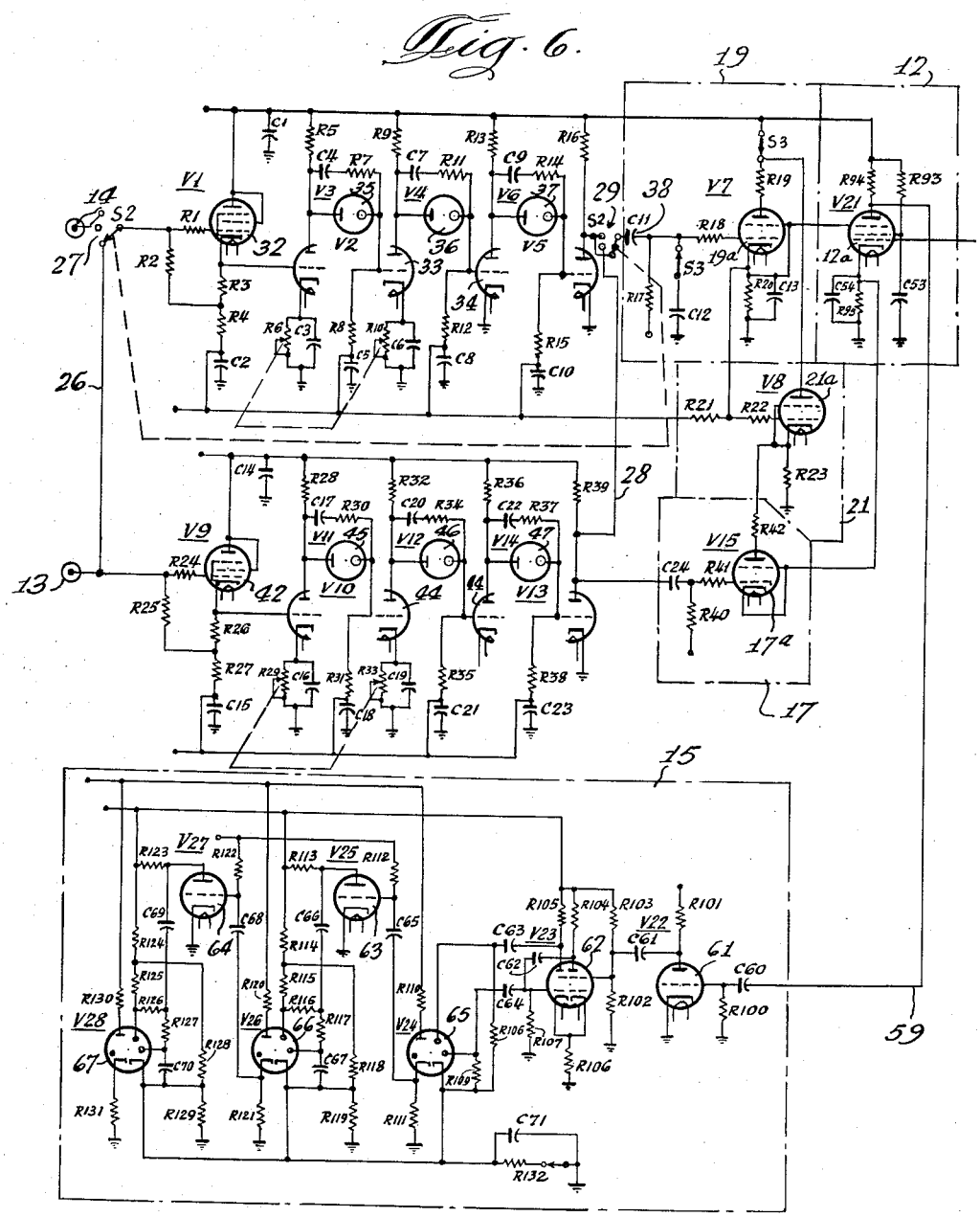
Figure 6 is a circuit diagram showing details of a system such as that denoted by the block diagram of Figure 5 exclusive of the pulse source and shaper circuitry.
Figure 6A:
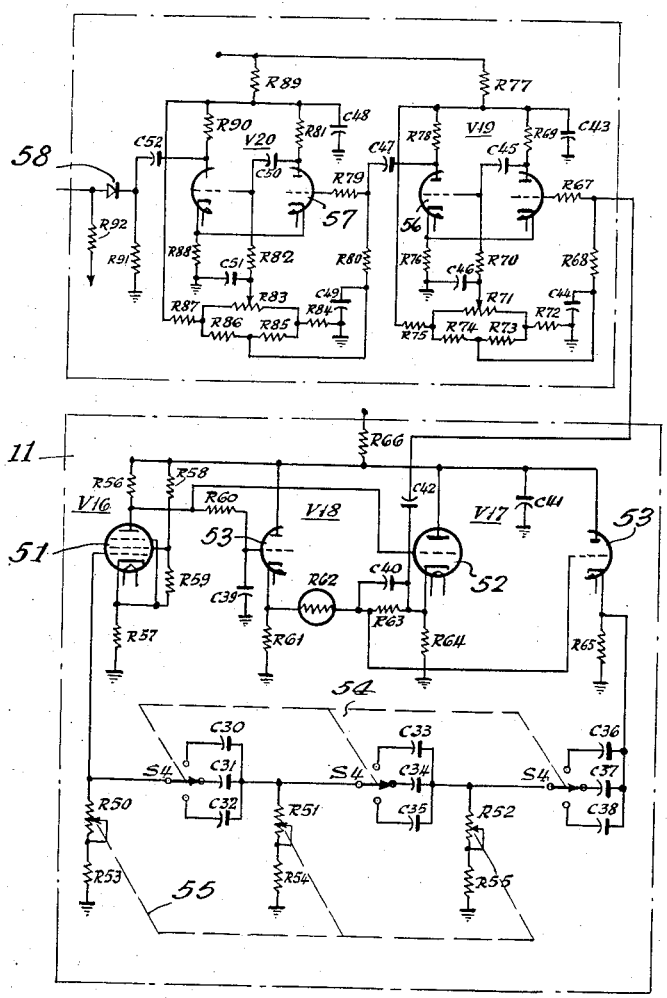
Figure 6A is a circuit diagram showing details of the pulse source and shaper circuitry of the block diagram of Figure 5.

Figure 6 shows the details of a circuit diagram corresponding to the block diagram of Figure 5. The input channel 14 previously was described as supplying a signal to a squaring circuit and a differentiator to control the lock-on thyratron 19. The signal 14 is supplied to a vacuum tube 32 connected in a cathode follower circuit, which in turn supplies signal to a plurality of double vacuum tubes 33 and 34 serving as clamper tubes and operating as a squaring circuit. Between the anode and grid of successive triode portions of the vacuum tubes 33 and 34 there are provided voltage regulator tubes 35, 36 and 37 which are connected in parallel with resistor capacitance circuits to improve the frequency characteristics of the squaring circuit. The output of the squaring circuit passes through a differentiating capacitor 38 to the grid of the lock-on thyratron 19A which applies a potential to one of the grids of the gate tube 12A. It will be noted that a portion of the voltage developed across the cathode resistors of the thyratron 19A is applied to the control electrode of the control thyratron 21A. The control thyratron 21A is connected to the anode of the lock-off thyratron 17A to control the anode potential thereof. The thyratron 19A establishes a positive bias of the grid of the gate tube 12A and a positive bias on the control thyratron 21A. The lock-off thyratron 17A supplies a negative bias to the grid circuit of the gate circuit 12A. The channel 13 is connected through a squaring and differentiator circuit which is similar to that employed for the channel of signal 14. This includes a cathode follower tube 42 and double triode tubes 43 and 44 which are provided with voltage regulator tubes 45, 46 and 47 with resistor capacitance parallel circuits to improve the frequency characteristics.

A conventional RC oscillator circuit is employed for the pulse source 11 and includes a plurality of vacuum tubes 51, 52 and a double triode 53. By means of a gang switch 54 a plurality of capacitance values may be selected and intermediate frequency determinations may be made by a plurality of gang control potentiometers or variable resistors 55. The output of the pulse source 11 is supplied to a shaper circuit 31 which includes a plurality of clipper amplifiers employing double triode vacuum tubes 56 and 57 which supply a signal to a differentiating circuit including a diode 58. The output of the diode is connected to one of the grids of the gate circuit 12. The pulses supplied to the gate circuit 12 are transmitted by a conductor 59 to a counter circuit and indicating arrangement 15 of conventional design. The circuit 15 therefore employs a triode 61, a double triode 62 and triodes 63 and 64. Three counter tubes 65, 66 and 67 are provided to give an indication such as the previously described 360°. The various circuit details of the foregoing circuit shown in Figure 6 should be readily apparent to those skilled in the art having familiarity with high impedance cathode followers, clamper tubes, differentiators, squaring tubes, clipper amplifiers, gate circuits and RC oscillators. Those skilled in the art, therefore, will be readily able to determine the operation of the circuit by reference to the following table of values for the different components employed:

| | |
|---|---|
| C1 | .25 |
| C2 | .005 |
| C3 | 20 |
| C4 | .1 |
| C5 | .005 |
| C6 | 20 |
| C7 | .1 |
| C8 | .005 |
| C9 | .1 |
| C10 | .005 |
| C11 | .001 |
| C13 | .25 |
| C14 | .25 |
| C15 | .005 |
| C16 | 20 |
| C17 | .1 |
| C18 | .005 |
| C19 | 20 |
| C20 | .1 |
| C21 | .005 |
| C22 | .1 |
| C23 | .005 |
| C24 | .001 |
| C30 | .65 |
| C31 | .065 |
| C32 | .0065 |
| C33 | .65 |
| C34 | .065 |
| C35 | .0065 |
| C36 | .65 |
| C37 | .065 |
| C38 | .0065 |
| C39 | 2 |
| C40 | mmf 450 |
| C41 | .25 |
| C42 | 2 |
| C43 | 40 |
| C44 | .25 |
| C45 | .25 |
| C46 | .25 |
| C47 | .25 |
| C48 | .25 |
| C49 | 40 |
| C50 | .25 |
| C51 | .25 |
| C52 | .0003 |
| C53 | 20 |
| C54 | .25 |
| C60 | .05 |
| C61 | mmf 100 |
| C62 | .0005 |
| C63 | .0005 |
| C64 | .0005 |
| C65 | .01 |
| C66 | .25 |
| C67 | .02 |
| C68 | .01 |
| C69 | .25 |
| C70 | .02 |
| C71 | .01 |
| R1 | 560 |
| R2 | 1m |
| R3 | 470 |
| R4 | 6.8k |
| R5 | 1k |
| R6 | 500 |
| R7 | 560 |
| R8 | 10k |
| R9 | 1k |
| R10 | 500 |
| R11 | 660 |
| R12 | 10k |
| R13 | 1k |
| R14 | 560 |
| R15 | 10k |
| R16 | 1k |
| R17 | 100k |
| R18 | 100k |
| R19 | 4k |
| R20 | 1k |
| R21 | 10k |
| R22 | 4.7k |
| R23 | 10k |
| R24 | 560 |
| R25 | 1m |
| R26 | 470 |
| R27 | 6.8k |
| R28 | 1k |
| R29 | 500 |
| R30 | 560 |
| R31 | 10k |
| R32 | 1k |
| R33 | 500 |
| R34 | 560 |
| R35 | 10k |
| R36 | 1k |
| R37 | 560 |
| R38 | 10k |
| R39 | 1k |
| R40 | 100k |
| R41 | 100k |
| R42 | 3.5k |
| R50 | 100k |
| R51 | 100k |
| R52 | 100k |
| R53 | 8k |
| R54 | 8k |
| R55 | 8k |
| R56 | 150k |
| R57 | 270 |
| R58 | 33k |
| R59 | 10k |
| R60 | 3.3m |
| R61 | 27k |
| R62 | Therm 1A |
| R63 | 15k |
| R64 | 27k |
| R65 | 47k |
| R66 | 220 |
| R67 | 100 |
| R68 | 4.7m |
| R69 | 470 |
| R70 | 4.7m |
| R71 | 10k |
| R72 | 22k |
| R73 | 47k |
| R74 | 47k |
| R75 | 47k |
| R76 | 6.8k |
| R77 | 220 |

| | |
|---|---|
| R78 | 2.2k |
| R79 | 100 |
| R80 | 4.7m |
| R81 | 560 |
| R82 | 4.7m |
| R83 | 20k |
| R84 | 22k |
| R85 | 10k |
| R86 | 10k |
| R87 | 47k |
| R88 | 6.8k |
| R89 | 220 |
| R90 | 1k |
| R91 | 47k |
| R92 | 47k |
| R93 | 1k |
| R94 | 680 |
| R95 | 1k |
| R100 | 470k |
| R101 | 47k |
| R102 | 120k |
| R103 | 2.2m |
| R104 | 6.8k |
| R105 | 22k |
| R106 | 4.7k |
| R107 | 100k |
| R108 | 1m |
| R109 | 1m |
| R110 | 1m |
| R111 | 47k |
| R112 | 470k |
| R113 | 39k |
| R114 | 150k |
| R115 | 47k |
| R116 | 47k |
| R117 | 33k |
| R118 | 10k |
| R119 | 100k |
| R120 | 470k |
| R121 | 47k |
| R122 | 470k |
| R123 | 39k |
| R124 | 150k |
| R125 | 47k |
| R126 | 47k |
| R127 | 33k |
| R128 | 10k |
| R129 | 100k |
| R130 | 470k |
| R131 | 47k |
| R132 | 6.8k |
| V1 | 6AQ5 |
| V2 | 6BK7 |
| V3 | 0B2 |
| V4 | 0B2 |
| V5 | 6BK7 |
| V6 | 0B2 |
| V7 | 2D21 |
| V8 | 2D21 |
| V9 | 6AQ5 |
| V10 | 6BK7 |
| V11 | 0B2 |
| V12 | 0B2 |
| V13 | 6BK7 |
| V14 | 0B2 |
| V15 | 2D21 |
| V16 | 6BD6 |
| V17 | 6C4 |
| V18 | (½) 12AU7 |
| V19 | 6J6 |
| V20 | 6J6 |
| V21 | 6AS6 |
| V22 | 6C4 |
| V23 | 12AT7 |
| V24 | GC10B |
| V25 | (½) 6J6 |
| V26 | GC10B |
| V27 | (½) 6J6 |
| V28 | GC10B |

While for the purpose of illustrating and describing the present invention certain preferred circuit arrangements and embodiments have been disclosed, it is to be understood that the invention is not to be limited thereby since such variations are contemplated may be commensurate with the spirit and scope of the invention set forth in the accompanying claims.

We claim as our invention:

1. The combination comprising a first source of alternating reference signal, a second source producing a phase-shifted alternating signal to be compared therewith, a gate circuit, a thyratron circuit connected between said first source and said gate circuit for initiating operation of said gate circuit whenever said reference signal crosses the zero line in a positive direction, a second thyratron circuit connected between said second source and said gate circuit for terminating operation of said gate circuit whenever said other signal crosses the zero line in a positive direction, a third thyratron circuit interconnecting said first and second thyratron circuits to preclude operation of said second thyratron circuit prior to the operation of said first thyratron circuit, a high frequency pulse source, means connecting said pulse source and said gate circuit for applying pulses from said pulse source to said gate circuit, an indicator, and means connecting said gate circuit and said indicator for applying pulses transmitted by said gate circuit to said indicator.

2. The combination comprising a first source of alternating reference signal, a second source producing a phase-shifted alternating signal to be compared therewith, a gate circuit, a thyratron circuit connecting said first source and said gate circuit for initiating operation of said gate circuit whenever said reference signal crosses the zero line in a positive direction, a second thyratron circuit connecting said second source and said gate circuit for terminating operation of said gate circuit whenever said other signal crosses the zero line in a positive direction, a third thyratron circuit interconnecting said first and second thyratron circuits to preclude operation of said second thyratron circuit prior to the operation of said first thyratron circuit, a high frequency pulse source connected to said gate circuit, and a pulse counter to indicate the phase difference between said reference signal and said other signal.

3. An ultra-low frequency phase measuring system including a first source of low frequency alternating reference signal, a second source producing a phase-shifted low frequency alternating signal to be compared therewith, first means connected to said first source for producing a first trigger pulse whenever the reference signal crosses the zero line in a positive direction, second means connected to said second source for producing a second trigger pulse whenever said phase-shifted signal crosses the zero line in a positive direction, first and second pulse-actuated thyratron circuits, means connecting said first and second thyratron circuits to the output of said first and second pulse-producing means respectively, a third circuit connected between said first and second thyratron circuits for insuring that the first thyratron circuit associated with the reference signal operates prior to the second thyratron circuit, a gate circuit connected to and controlled by said first and second thyratron circuits, a high frequency pulse source connected to the input of said gate circuit, and means connected to the output of said gate circuit for indicating the number of pulses transmitted thereby.

4. An ultra-low frequency measuring system including a first source of low frequency alternating reference signal, a second source producing a phase-shifted low frequency alternating signal to be compared therewith, first circuit means connected to said first signal source for producing a trigger pulse whenever the signal crosses the zero line in a positive direction, second circuit means connected to said second signal source for producing a trigger pulse whenever the signal from said second source crosses the zero line in a positive direction, first and second thyratron circuits connected to the output of said first and second trigger pulse means, a third thyratron circuit connected to said first and second thyratron circuits for insuring that the thyratron circuit associated with the reference signal trigger pulse means operates prior to the other thyratron circuit, a gate circuit connected to said first and second thyratron circuits having its operation initiated and terminated by said first and second thyratron circuits respectively, and means connected to said gate circuit for indicating the length of time said gate circuit is operative.

5. An ultra-low frequency measuring system as defined by claim 4 wherein said last-mentioned means is a counter connected to the output of the gate circuit for counting the number of pulses transmitted by said gate circuit.

References Cited in the file of this patent

UNITED STATES PATENTS

| | | |
|---|---|---|
| 2,332,300 | Cook | Oct. 19, 1943 |
| 2,411,573 | Holst | Nov. 26, 1943 |
| 2,370,692 | Shepherd | Mar. 6, 1945 |
| 2,412,111 | Wilson | Dec. 3, 1946 |
| 2,414,107 | Kenyon | Jan. 14, 1947 |
| 2,414,479 | Miller | Jan. 21, 1947 |
| 2,461,456 | Usselman | Feb. 8, 1949 |
| 2,513,477 | Gubin | July 4, 1950 |
| 2,514,309 | Buehler | July 11, 1950 |
| 2,545,082 | Grosdoff | Mar. 13, 1951 |
| 2,666,848 | Goodwin | Jan. 19, 1954 |

OTHER REFERENCES

Miller (abstract) filed December 11, 1946, published July 19, 1949.

"Time-Base Generator for Control," article in Tele-Tech and Electronic Industries, October 1953, pp. 84-85 and 144.